(12) United States Patent
Colston et al.

(10) Patent No.: US 10,568,461 B2
(45) Date of Patent: Feb. 25, 2020

(54) MULTI-TIERED GRILL RACK SYSTEM AND GRILL MOUNTS

(71) Applicant: Traeger Pellet Grills, LLC, Salt Lake City, UT (US)

(72) Inventors: Michael Colston, Stephensville, MI (US); Daniel Altenritter, Riverton, UT (US); Matthew Czach, Kalamazoo, MI (US)

(73) Assignee: Traeger Pellet Grills, LLC, Salt Lake City, UT (US)

( * ) Notice: Subject to any disclaimer, the term of this patent is extended or adjusted under 35 U.S.C. 154(b) by 594 days.

(21) Appl. No.: 15/070,220

(22) Filed: Mar. 15, 2016

(65) Prior Publication Data

US 2017/0065124 A1    Mar. 9, 2017

Related U.S. Application Data

(60) Provisional application No. 62/216,136, filed on Sep. 9, 2015.

(51) Int. Cl.
*A47J 37/07* (2006.01)
*A47J 37/06* (2006.01)

(52) U.S. Cl.
CPC ......... *A47J 37/0704* (2013.01); *A47J 37/067* (2013.01)

(58) Field of Classification Search
None
See application file for complete search history.

(56) References Cited

U.S. PATENT DOCUMENTS

| 639,099 A | 12/1899 | Schoregge |
|---|---|---|
| 1,300,710 A | 4/1919 | Edwards |
| 2,902,026 A | 9/1959 | Hathorn |
| D188,879 S | 9/1960 | Gauss |

(Continued)

FOREIGN PATENT DOCUMENTS

| CN | 104352179 | 2/2015 |
|---|---|---|
| FR | 2132681 A1 | 11/1972 |
| JP | 59-174411 U | 11/1984 |

OTHER PUBLICATIONS

Non-Final Action mailed for U.S. Appl. No. 15/070,225 dated Feb. 23, 2018.

(Continued)

*Primary Examiner* — David J Laux
(74) *Attorney, Agent, or Firm* — TraskBritt

(57) ABSTRACT

Grill rack systems include at least three grill racks and a mounting assembly for supporting the grill racks. The mounting assembly includes a plurality of grill rack mounting elements that are connectable to an inner surface of a grilling device. A grilling device with grill rack system includes an oven section having an outer wall that partially bounds an internal grilling compartment with an access opening and a lid that selectively covers the access opening. The grilling device also includes a grill rack system having at least three grill racks supported by a mounting assembly inside the internal grilling compartment. Oval-shaped grilling devices have the grill racks mounted therein in a vertically spaced configuration, with the front edge of each grill rack progressively recessed relative to an adjacent lower grill rack. At least one grill rack can have a removable grill rack insert and/or be slidable into the grill.

20 Claims, 10 Drawing Sheets

(56) References Cited

U.S. PATENT DOCUMENTS

| | | |
|---|---|---|
| D196,553 S | 10/1963 | Mayer |
| D196,996 S | 11/1963 | Kates |
| 3,533,393 A | 10/1970 | Haapanen |
| 3,665,913 A | 5/1972 | Cagle |
| 3,769,901 A | 11/1973 | Phillips |
| 3,791,370 A | 2/1974 | Fauser |
| 3,883,104 A | 5/1975 | Delafield |
| 3,938,493 A | 2/1976 | Bauer |
| 3,945,740 A | 3/1976 | Weiler |
| 4,076,008 A | 2/1978 | Deaton |
| 4,132,178 A | 1/1979 | Mueller et al. |
| 4,233,890 A | 11/1980 | Jansen |
| 4,362,093 A | 12/1982 | Griscom |
| 4,592,335 A | 6/1986 | Beller |
| 4,665,891 A | 5/1987 | Nemec |
| 4,700,618 A | 10/1987 | Cox |
| 4,788,906 A | 12/1988 | Starks |
| 5,031,602 A | 7/1991 | Vick |
| D320,527 S | 10/1991 | Carroll |
| 5,070,857 A | 12/1991 | Sarten |
| 5,163,359 A | 11/1992 | McLane |
| D350,668 S | 9/1994 | Giebel et al. |
| 5,404,795 A | 4/1995 | Coble |
| 5,473,979 A * | 12/1995 | Ruben .............. A47J 37/0704 99/446 |
| 5,481,964 A | 1/1996 | Kitten |
| 5,483,947 A | 1/1996 | Giebel et al. |
| D369,716 S | 5/1996 | Blanc |
| 5,524,610 A | 6/1996 | Clark |
| D376,510 S | 12/1996 | Ting |
| 5,694,917 A * | 12/1997 | Giebel .............. A47J 37/0713 126/25 R |
| 5,934,180 A | 8/1999 | Lin |
| D414,374 S | 9/1999 | Ting |
| 5,947,007 A * | 9/1999 | O'Grady ............ A47J 37/0763 126/25 R |
| 6,000,388 A * | 12/1999 | Andress ............ A47J 37/0718 126/25 AA |
| D428,303 S | 7/2000 | Wagner et al. |
| D428,760 S | 8/2000 | Huang |
| 6,125,836 A | 10/2000 | Felton |
| 6,182,560 B1 * | 2/2001 | Andress ............ A47J 37/0718 126/25 R |
| 6,189,528 B1 * | 2/2001 | Oliver ............... A47J 37/0704 126/25 R |
| 6,209,533 B1 | 4/2001 | Ganard |
| D456,202 S | 4/2002 | McNair et al. |
| D456,203 S | 4/2002 | Peloquin |
| D460,312 S | 7/2002 | Fry et al. |
| D460,658 S | 7/2002 | Wu |
| 6,422,134 B1 | 7/2002 | Barksdale |
| D466,358 S | 12/2002 | Eisinger et al. |
| 6,557,545 B2 | 5/2003 | Williams |
| D480,595 S | 10/2003 | Pai |
| D485,116 S | 1/2004 | Kwok |
| D494,406 S | 8/2004 | Zhang |
| D496,821 S | 10/2004 | Pai |
| 6,810,792 B1 | 11/2004 | Knight |
| D504,274 S | 4/2005 | Ceccon |
| D504,798 S | 5/2005 | Nipke et al. |
| D505,824 S | 6/2005 | Nipke et al. |
| 6,913,011 B1 * | 7/2005 | Snider ............... A47J 37/0704 126/25 R |
| D507,927 S | 8/2005 | Nipke et al. |
| D508,364 S | 8/2005 | Nipke et al. |
| D508,365 S | 8/2005 | Nipke et al. |
| D510,835 S | 10/2005 | Pai |
| D510,838 S | 10/2005 | Nipke et al. |
| D511,924 S | 11/2005 | Chung |
| D512,263 S | 12/2005 | Chung |
| D516,366 S | 3/2006 | Nipke et al. |
| D526,831 S | 8/2006 | Chung |
| D526,833 S | 8/2006 | Chung |
| D526,834 S | 8/2006 | Chung |
| D528,847 S | 9/2006 | Chung |
| D534,755 S | 1/2007 | Knight |
| D535,522 S | 1/2007 | Seager |
| 7,156,087 B1 | 1/2007 | Churchhill |
| D562,619 S | 2/2008 | Henley et al. |
| D563,148 S | 3/2008 | Henry |
| D572,072 S | 7/2008 | Chung |
| D576,833 S | 9/2008 | Mansell |
| D579,260 S | 10/2008 | Zischke |
| D583,185 S | 12/2008 | Rutter et al. |
| D592,442 S | 5/2009 | Rutter et al. |
| 7,624,675 B2 | 12/2009 | Galdamez |
| D609,959 S | 2/2010 | Chen |
| D618,037 S | 6/2010 | Chung |
| D618,483 S | 6/2010 | Chung |
| 7,753,047 B1 | 7/2010 | Trammell |
| D623,003 S | 9/2010 | Chung |
| D623,888 S | 9/2010 | Chung |
| 7,798,057 B2 | 9/2010 | Ritterling |
| D631,279 S | 1/2011 | Davis |
| 7,861,705 B2 | 1/2011 | Hulsey |
| D638,654 S | 5/2011 | Plott |
| 7,984,709 B1 | 7/2011 | Brynes |
| D648,975 S | 11/2011 | Chiang |
| D653,494 S | 2/2012 | Chung |
| D657,181 S | 4/2012 | Chung |
| D660,646 S | 5/2012 | Simms |
| D668,097 S | 10/2012 | Simms, II |
| 8,381,712 B1 | 2/2013 | Simms |
| D680,794 S | 4/2013 | Chung |
| D680,795 S | 4/2013 | Chung |
| D680,796 S | 4/2013 | Chung |
| D687,667 S | 8/2013 | Chien |
| D708,002 S | 7/2014 | Cruccolini |
| D709,315 S | 7/2014 | Witzel et al. |
| D714,090 S | 9/2014 | Harper |
| D717,094 S | 11/2014 | Chung |
| D717,095 S | 11/2014 | Chung |
| D717,096 S | 11/2014 | Chung |
| D717,098 S | 11/2014 | Chung |
| 8,915,238 B2 * | 12/2014 | Goeken ............. A47J 37/0704 126/25 R |
| D724,714 S | 3/2015 | Benson et al. |
| D724,886 S | 3/2015 | Chung |
| D736,026 S | 8/2015 | Kam et al. |
| D738,155 S | 9/2015 | Chung |
| D739,170 S | 9/2015 | Chung |
| D744,775 S | 12/2015 | Yang |
| D767,936 S | 10/2016 | Yang |
| D780,502 S | 3/2017 | Gloger |
| D786,014 S | 5/2017 | Knight |
| D796,258 S | 9/2017 | Streckfus |
| D798,645 S | 10/2017 | Lira-Nunez et al. |
| D798,646 S | 10/2017 | Lira-Nunez |
| D799,259 S | 10/2017 | Lira-Nunez et al. |
| D806,463 S | 1/2018 | Gloger |
| D814,226 S | 4/2018 | Mansueto et al. |
| D817,091 S | 5/2018 | Colston |
| D817,684 S | 5/2018 | Mansueto et al. |
| D825,990 S | 8/2018 | Colston |
| D827,368 S | 9/2018 | Colston |
| D827,370 S | 9/2018 | Colston |
| D827,371 S | 9/2018 | Colston |
| D829,049 S | 9/2018 | Measom et al. |
| D829,050 S | 9/2018 | Measom et al. |
| D832,046 S | 10/2018 | Chung |
| D835,448 S | 12/2018 | Mansueto et al. |
| D839,047 S | 1/2019 | Colston |
| 10,213,051 B2 | 2/2019 | Colston et al. |
| D842,637 S | 3/2019 | Mansueto et al. |
| D844,361 S | 4/2019 | Chung |
| 2002/0020405 A1 | 2/2002 | Coleman et al. |
| 2003/0019491 A1 | 1/2003 | Bossler |
| 2003/0019492 A1 | 1/2003 | Williams |
| 2003/0029324 A1 | 2/2003 | Gillespie et al. |
| 2005/0204934 A1 | 9/2005 | Robertson |
| 2005/0217659 A1 | 10/2005 | McClenahan |
| 2006/0016447 A1 | 1/2006 | Meyer |
| 2006/0042475 A1 | 3/2006 | Craig |

(56) References Cited

U.S. PATENT DOCUMENTS

| | | | |
|---|---|---|---|
| 2006/0137676 A1* | 6/2006 | Barker | A47J 36/12 |
| | | | 126/25 R |
| 2007/0163568 A1 | 7/2007 | Murray | |
| 2007/0175467 A1 | 8/2007 | Liu | |
| 2007/0277805 A1 | 12/2007 | Ho | |
| 2008/0011285 A1 | 1/2008 | Milligan | |
| 2009/0139151 A1 | 6/2009 | Quam et al. | |
| 2009/0199839 A1* | 8/2009 | Hulsey | A47J 37/07 |
| | | | 126/25 A |
| 2010/0024797 A1 | 2/2010 | Tsung | |
| 2010/0059038 A1 | 3/2010 | Ho | |
| 2010/0083947 A1 | 4/2010 | Guillory | |
| 2011/0079209 A1 | 4/2011 | Bruno et al. | |
| 2011/0079210 A1 | 4/2011 | Jackovitch | |
| 2011/0083659 A1 | 4/2011 | Grasso et al. | |
| 2012/0192726 A1 | 8/2012 | Clearman | |
| 2012/0216790 A1 | 8/2012 | Hopkins | |
| 2012/0266857 A1 | 10/2012 | Lin | |
| 2013/0061765 A1 | 3/2013 | Reinhart | |
| 2013/0112088 A1* | 5/2013 | May | A47J 37/07 |
| | | | 99/421 H |
| 2013/0206132 A1 | 8/2013 | Simms, II | |
| 2013/0292520 A1 | 11/2013 | Alden et al. | |
| 2013/0298894 A1 | 11/2013 | Kleinsasser | |
| 2014/0090634 A1 | 4/2014 | Li | |
| 2014/0261012 A1 | 9/2014 | Perez, Jr. et al. | |
| 2015/0047512 A1 | 2/2015 | Marra | |
| 2015/0047515 A1 | 2/2015 | Jenness | |
| 2015/0047625 A1* | 2/2015 | Weil | A47J 37/0713 |
| | | | 126/25 A |
| 2015/0079250 A1* | 3/2015 | Ahmed | A23B 4/052 |
| | | | 426/314 |
| 2015/0144238 A1 | 5/2015 | Traeger | |
| 2015/0265099 A1* | 9/2015 | Coffie | A47J 37/0704 |
| | | | 99/339 |
| 2015/0305559 A1* | 10/2015 | Chung | A47J 37/0713 |
| | | | 126/25 R |
| 2016/0345739 A1 | 12/2016 | McCullough | |
| 2017/0065124 A1 | 3/2017 | Colston | |
| 2017/0067649 A1 | 3/2017 | Colston | |
| 2017/0196400 A1 | 7/2017 | Colston | |
| 2019/0150663 A1 | 5/2019 | Colston et al. | |

OTHER PUBLICATIONS

Restriction Requirement for application No. 14/906,526 dated Sep. 12, 2017.

International Search Report and Written Opinion for application No. PCT/US2015/046349 dated Dec. 28, 2015.

Combined Search Examination Report for application No. GB1604584.1 dated Aug. 1, 2016.

AMAZON.COM Inc., 2014, "The Original Bar-Be Quick Build In Grill & Bake + Free pack of Beechwood smoking chips", amazon.co.uk, [online], Available from https://www.amazon.co.uk/Original-Bar-Be-Quick-Build-Beechwood-smoking/dp/B00IGUPK4C [Accessed Jul. 22, 2015].

International Search Report for application No. PCT/US2016/051066 dated Dec. 8, 2016.

Non-Final Office Action for U.S. Appl. No. 29/539,822 dated Dec. 28, 2017.

Traeger Timberline 1300, by John R. Delaney, PCMag [online], published Aug. 4, 2017, [retreived on Dec. 21, 2017]. Retreived from the Internet, URL: https://www.pcmag.com/review/355354/traeger-timberline-1300.

International Search Report for application No. PCT/US2016/051060 dated Dec. 8, 2016.

Non-Final Office Action for U.S. Appl. No. 14/906,526 dated Dec. 11, 2017.

Notice of Allowance mailed for U.S. Appl. No. 15/070,225 dated Oct. 10, 2018.

European Search Report and Search Opinion Received for EP Application No. 16845165, dated Jan. 31, 2019, 6 pages.

International Preliminary Report on Patentability received for PCT Patent Application No. PCT/US16/51060, dated Dec. 9, 2017, dated Oct. 9, 2017, 55 pages.

Non-Final Office Action for U.S. Appl. No. 29/539,825 dated Dec. 28, 2017.

Australian Office Action for AU Application No. 2017374059, dated May 24, 2019, 8 pages.

Canadian Office Action Mailed for CA Application No. 3008643, dated Feb. 28, 2019, 4 pages.

European search opinion dated Jan. 31, 2019 for EP Application No. 16845165.

European Search Report and Search Opinion Received for EP Application No. 16845167, dated Jan. 31, 2019, 6 pages.

Ex Parte Quayle Action for U.S. Appl. No. 29/539,822, dated Jun. 13, 2018 5 pages.

Final Rejection for U.S. Appl. No. 15/070,220, dated Feb. 1, 2019, 11 pages.

International Search Report for International Application No. PCT/US2017/067370, dated Apr. 16, 2018, 5 pages.

International Written Opinion for International Application No. PCT/US2017/067370, dated Apr. 16, 2018, 9 pages.

International Written Opinion for International Application No. PCT/US16/51060, dated Dec. 8, 2016, 10 pages.

International Written Opinion for International Application No. PCT/US16/51066, dated Dec. 8, 2016, 10 pages.

IPEA/408—Written Opinion of the IPEA dated Dec. 8, 2016 for WO Application No. PCT/US16/051060.

Non-Final Rejection for U.S. Appl. No. 15/070,220, dated Jun. 21, 2019 12 pages.

Non-Final Rejection for U.S. Appl. No. 15/070,220, dated Sep. 6, 2018 13 pages.

Non-Final Rejection for U.S. Appl. No. 29/539,822, dated Dec. 28, 2017, 10 pages.

Notice of Allowance for U.S. Appl. No. 29/539,822, dated Sep. 4, 2018 8 pages.

Supplementary European search report dated Jan. 22, 2019 for EP Application No. 16845165.

Supplementary European search report dated Jan. 23, 2019 for EP Application No. 16845167, 6 pages.

Supplementary European search report dated Jun. 27, 2019 for EP Application No. 17889301, 9 pages.

* cited by examiner

MULTI-TIERED GRILL RACK SYSTEM AND GRILL MOUNTS

CROSS-REFERENCE TO RELATED APPLICATIONS

This application claims priority to and the benefit of U.S. Provisional Patent Application No. 62/216,136, entitled "Three-tiered Gill Rack System and Grill Mounts," filed on Sep. 9, 2015, which application is incorporated by reference herein in its entirety.

BACKGROUND

1. Technical Field

The present disclosure relates to systems, methods, and devices for grilling and/or smoking food products. In particular, the present disclosure relates to grilling devices having a three (or more) tiered internal grill rack system and/or a substantially oval cross-sectional shape.

2. Related Technology

Grilling and smoking food products typically includes the use of a device (e.g., grill or smoker) having an oven compartment. When the lid is closed, the device can retain heat and smoke within the oven compartment to cook and smoke the food product. Recent trends include grilling devices having a barrel-shaped outer wall with a circular cross-section, a frontal opening in the outer wall, and an upward-opening, rounded lid attached to the top of the outer wall. The grilling devices also include a grilling rack disposed in the oven compartment adjacent to a heat source. Some grilling devices also include a second, warming rack disposed in the oven compartment above the grilling rack and away from the heat source. A user can cook food on the lower rack, and then move the cooked food to the upper rack to keep it warm while additional food is cooked on the lower rack. Alternatively, food may be slow-cooked or smoked on the upper rack.

Unfortunately, the size and circular cross-section of the residential barrel-shaped grills present a problem for users interested in cooking on more than two levels. In particular, while the rounded configuration may enhance heat and smoke circulation, the rounded top and bottom portions limit the area of the oven compartment substantially over other grills. For instance, upper grill racks may need to be shorted (front-to-back) so that they fit in the oven compartment when the lid is closed. This can substantially limit the amount of cooking space in such grills.

Moreover, inclusion of a third or fourth grill rack (level) in such rounded oven compartments may encumber the grilling space and/or inconvenience the user. Accordingly, users are often left to forgo a desirable rounded configuration to obtain additional grilling space or choose between the upper and lower grill racks (and adjust the heat in order to fine-tune specific cooking procedures) in the rounded grills.

Accordingly, there are a number of disadvantages in grilling devices and systems that can be addressed.

BRIEF SUMMARY

Implementations of the present disclosure solve one or more of the foregoing or other problems in the art with improved grilling devices, as well as components and/or sub-components thereof, and systems and methods incorporating the same. In particular, implementations of the present disclosure relate to a grilling device having a three (or more) tiered grill rack system and/or an oval shaped configuration.

For instance, one or more implementations of the present disclosure can include a substantially barrel-shaped, wood pellet grill having a rounded outer wall partially bounding an inner cavity. The outer wall can have an elongated middle portion that increases the height of the grilling area and the internal volume of the inner cavity. An opening disposed in the outer wall can be covered by a lid and/or the cavity can have three or more grill racks disposed therein. The grilling device can be adapted for an optimal use by providing increased grilling surfaces within the larger grilling cavity.

Additional features and advantages of exemplary implementations of the present disclosure will be set forth in the description which follows, and in part will be obvious from the description, or may be learned by the practice of such exemplary implementations. The features and advantages of such implementations may be realized and obtained by means of the instruments and combinations particularly pointed out in the appended claims. These and other features will become more fully apparent from the following description and appended claims, or may be learned by the practice of such exemplary implementations as set forth hereinafter.

BRIEF DESCRIPTION OF THE DRAWINGS

In order to describe the manner in which the above-recited and other advantages and features of the present disclosure can be obtained, a more particular description of the implementations briefly described above will be rendered by reference to specific implementations thereof which are illustrated in the appended drawings. For better understanding, the like elements have been designated by like reference numbers throughout the various accompanying figures. Understanding that these drawings depict only typical implementations of the invention and are not therefore to be considered to be limiting of its scope, the invention will be described and explained with additional specificity and detail through the use of the accompanying drawings in which.

DETAILED DESCRIPTION

Figure 1:
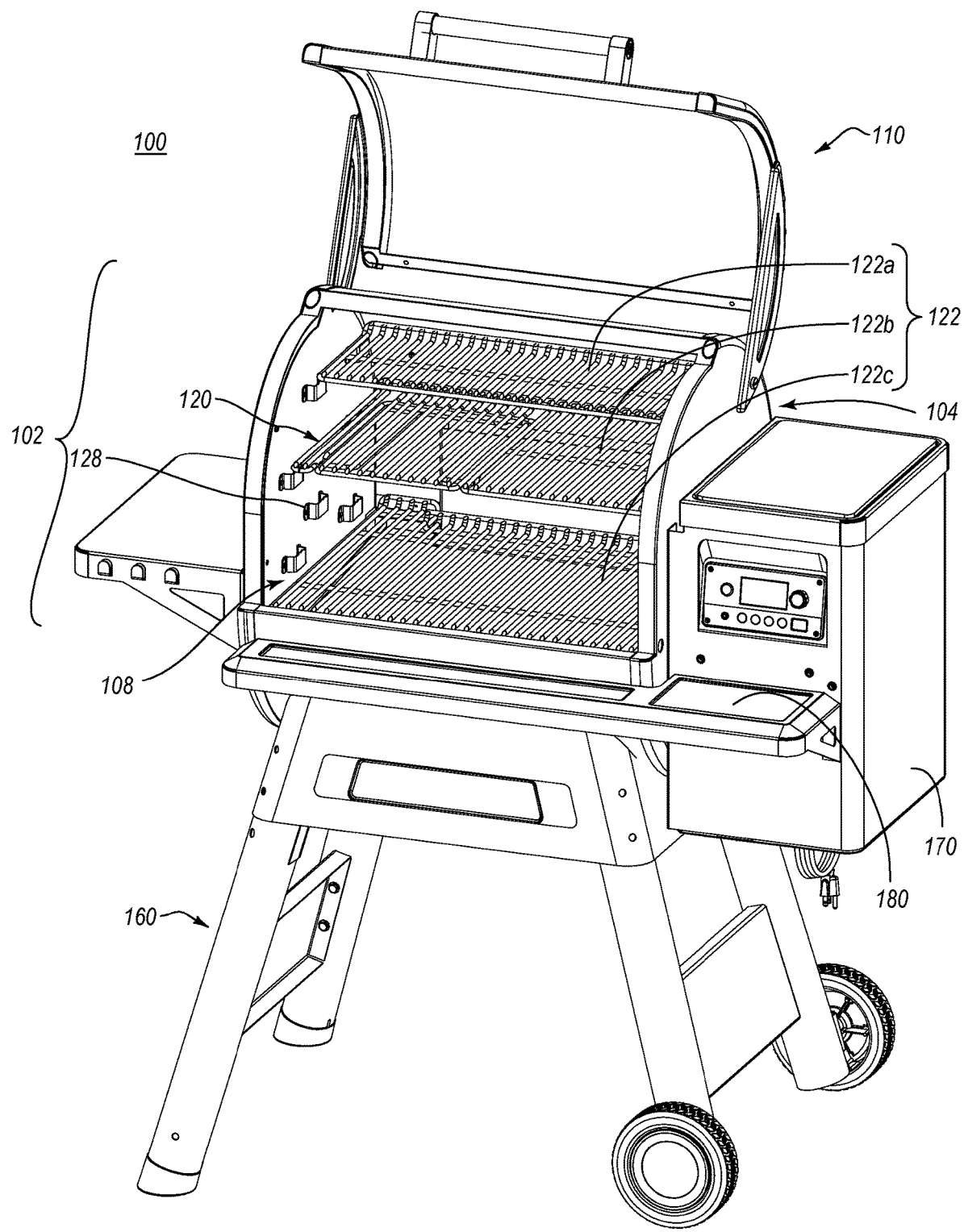
FIG. 1 illustrates a perspective view of a grilling device having a three-tiered grill rack system according to an implementation of the present disclosure.

Before describing the present disclosure in detail, it is to be understood that this disclosure is not limited to the specific parameters of the particularly exemplified systems, apparatus, assemblies, products, devices, kits, methods, and/or processes, which may, of course, vary. It is also to be understood that much, if not all of the terminology used herein is only for the purpose of describing particular embodiments of the present disclosure, and is not necessarily intended to limit the scope of the disclosure in any particular manner. Thus, while the present disclosure will be described in detail with reference to specific configurations, embodiments, and/or implementations thereof, the descriptions are illustrative only and are not to be construed as limiting the scope of the claimed invention.

Various aspects of the present disclosure, including devices, systems, methods, etc., may be illustrated with reference to one or more exemplary embodiments or implementations. As used herein, the terms "exemplary embodiment" and/or "exemplary implementation" mean "serving as an example, instance, or illustration," and should not necessarily be construed as preferred or advantageous over other embodiments or implementations disclosed herein. In addition, reference to an "implementation" of the present disclosure or invention includes a specific reference to one or more embodiments thereof, and vice versa, and is intended to provide illustrative examples without limiting the scope of the invention, which is indicated by the appended claims rather than by the following description.

Furthermore, unless defined otherwise, all technical and scientific terms used herein have the same meaning as commonly understood by one of ordinary skill in the art to which the present disclosure pertains. While a number of methods, materials, components, etc. similar or equivalent to those described herein can be used in the practice of the present disclosure, only certain exemplary methods, materials, components, etc. are described herein.

It will be noted that, as used in this specification and the appended claims, the singular forms "a," "an" and "the" include plural referents unless the content clearly dictates otherwise. Thus, for example, reference to a "column" includes one, two, or more columns. Similarly, reference to a plurality of referents should be interpreted as comprising a single referent and/or a plurality of referents unless the content and/or context clearly dictate otherwise. Thus, reference to "columns" does not necessarily require a plurality of such columns. Instead, it will be appreciated that independent of conjugation; one or more columns are contemplated herein.

As used throughout this application the words "can" and "may" are used in a permissive sense (i.e., meaning having the potential to), rather than the mandatory sense (i.e., meaning must). Additionally, the terms "including," "having," "involving," "containing," "characterized by," as well as variants thereof (e.g., "includes," "has", "involves," "contains," etc.), and similar terms as used herein, including the claims, shall be inclusive and/or open-ended, shall have the same meaning as the word "comprising" and variants thereof (e.g., "comprise" and "comprises"), and do not exclude additional, un-recited elements or method steps, illustratively.

Various aspects of the present disclosure can be illustrated by describing components that are coupled, attached, connected, and/or joined together. As used herein, the terms "coupled", "attached", "connected," and/or "joined" are used to indicate either a direct association between two components or, where appropriate, an indirect association with one another through intervening or intermediate components. In contrast, when a component is referred to as being "directly coupled", "directly attached", "directly connected," and/or "directly joined" to another component, no intervening elements are present or contemplated.

Thus, as used herein, the terms "connection," "connected," and the like do not necessarily imply direct contact between the two or more elements. In addition, components that are coupled, attached, connected, and/or joined together are not necessarily (reversibly or permanently) secured to one another. For instance, coupling, attaching, connecting, and/or joining can comprise placing, positioning, and/or disposing the components together or otherwise adjacent in some implementations.

As used herein, directional and/or arbitrary terms, such as "top," "bottom," "front," "back," "forward," "rear," "left," "right," "up," "down," "upper," "lower," "inner," "outer," "internal," "external," "interior," "exterior," "anterior," "posterior," "proximal," "distal," and the like can be used only for convenience and/or solely to indicate relative directions and/or orientations and may not otherwise be intended to limit the scope of the disclosure, including the specification, invention, and/or claims. According, such directional and/or arbitrary terms are not to be construed as necessarily requiring a specific order or position.

To facilitate understanding, like reference numerals have been used, where possible, to designate like elements common to the figures. Furthermore, alternative configurations of a particular element may each include separate letters appended to the element number. Accordingly, an appended letter can be used to designate an alternative design, structure, function, implementation, and/or embodiment of an element or feature without an appended letter. Similarly, multiple instances of an element and or sub-elements of a parent element may each include separate letters appended to the element number.

In each case, the element label may be used without an appended letter to generally refer to instances of the element or any one of the alternative elements. Element labels including an appended letter can be used to refer to a specific instance of the element or to distinguish or draw attention to multiple uses of the element. However, element labels including an appended letter are not meant to be limited to the specific and/or particular embodiment(s) in which they are illustrated. In other words, reference to a specific feature in relation to one embodiment should not be construed as being limited to applications only within said embodiment.

It will also be appreciated that where two or more values, or a range of values (e.g., less than, greater than, at least, and/or up to a certain value, and/or between two recited values) is disclosed or recited, any specific value or range of values falling within the disclosed values or range of values is likewise disclosed and contemplated herein. Thus, disclosure of an illustrative measurement or distance less than or equal to about 10 units or between 0 and 10 units includes, illustratively, a specific disclosure of: (i) a measurement of 9 units, 5 units, 1 units, or any other value between 0 and 10 units, including 0 units and/or 10 units; and/or (ii) a measurement between 9 units and 1 units, between 8 units and 2 units, between 6 units and 4 units, and/or any other range of values between 0 and 10 units.

Various modifications can be made to the illustrated embodiments without departing from the spirit and scope of the invention as defined by the claims. Thus, while various aspects and embodiments have been disclosed herein, other aspects and embodiments are contemplated. It is also noted that systems, apparatus, assemblies, products, devices, kits, methods, and/or processes, according to certain embodiments of the present disclosure may include, incorporate, or otherwise comprise properties, features, components, members, and/or elements described in other embodiments disclosed and/or described herein. Thus, reference to a specific feature in relation to one embodiment should not be construed as being limited to applications only within said embodiment.

The headings used herein are for organizational purposes only and are not meant to be used to limit the scope of the description or the claims.

Embodiments of the present disclosure include systems, methods, and devices for grilling. In particular, certain implementations of the present disclosure relate to improved grills and grilling devices, as well as components and/or sub-components thereof and/or systems, methods, and apparatus incorporating the same. Some implementations of the present disclosure relate to grilling devices having a three (or more) tiered internal grill rack system and/or a substantially oval cross-sectional shape.

For instance, one or more implementations of the present disclosure can include a substantially barrel-shaped, wood pellet grill having a rounded outer wall partially bounding an inner cavity. The inner cavity can also have a rounded configuration corresponding to the shape of the outer wall. The outer wall can also have an elongated middle portion (forming a substantially oval shape). The elongated outer wall can increase the height of the internal grilling area and/or the internal volume of the inner cavity compared to a grill having a more cylindrical outer wall and/or inner cavity.

In some embodiments, however, the outer wall and inner cavity can have different shapes. For instance, the inner cavity can have a rounded cross-sectional shape while the outer wall has a substantially rectangular shape. Alternatively, the inner cavity can have an elongated, oval cross-sectional shape while the exterior surface may have a non-oval cross-sectional shape.

An opening disposed in the outer wall can be covered by a lid and/or the cavity can have three or more grill racks disposed therein. The grilling device can be adapted for an optimal use by providing increased grilling surfaces within the larger grilling cavity.

It will be appreciated that while reference is made to "grills," "grilling," "grilling devices," "grilling systems," and the like, the present disclosure extends to smoking, baking, roasting, braising, barbequing, and other food preparation methods, as well as devices and systems for warming, cooking, and/or preparing food products in any of the above-recited or other manners. Likewise, while reference is made to an "oven section," "cooking section," "heating area," and the like, the present disclosure also extends to various spaces suitable for heating, including open grilling surfaces (e.g., exposed to ambient air), closed kilns and ovens, heating spaces that can be selectively opened and closed, and the like.

Accordingly, the particular features, configurations, design characteristics, and/or components (assemblies) described herein can be applicable to a variety of different fields of use extending beyond cooking or otherwise preparing food products. These different fields of use are also contemplated herein. Thus, reference to one or more "grills," "grilling," "grilling devices," "grilling systems," and the like, or one or more components thereof, should not be construed as being limited only to applications involving food grilling or grilling devices.

Grills of the present disclosure can be heated using a variety of fuels. For example, the disclosure extends to grills configured to burn propane and/or natural gas and grills configured to burn solid fuel (e.g., charcoal, briquettes, wood, etc.). In some embodiments, the grill is configured to use wood pellets as fuel. In addition, in some embodiments, grills according to the present disclosure are configured to be moveable (e.g., by means of wheel(s) or other moving elements).

In other embodiments, grills may be configured as stationary appliances and/or may be installed in a relatively permanent fashion (e.g., bolted or otherwise fastened to a wall and/or floor, or otherwise installed as part of a kitchen or cooking area). Furthermore, grills according to the present disclosure can be configured for outdoor use in some embodiments. For instance, certain regulations and/or safety concerns may require and/or recommend the use of combustion-style grills only in outdoor, open-air areas, away from structures, vegetation, and/or other potentially flammable materials.

In addition, certain embodiments may be described with reference to one or more metals or metal materials. As used herein, the term "metal" refers to a material that comprises an elemental metal or metal alloy, blend, or combination. Certain embodiments may also refer to heat and/or smoke distribution and/or circulation. It will be appreciated that such forms of directing and/or using heat and/or smoke can include active distribution and/or circulation and/or passive distribution and/or circulation.

It is further to be understood that some of the drawings included herewith, and which are referenced herein, are diagrammatic, schematic, and other representations of example embodiments, and are not limiting on the present disclosure. Moreover, while various drawings are provided at a scale that is considered functional for some embodiments, the drawings are not necessarily drawn to scale for all contemplated embodiments. No inference should therefore be drawn from the drawings as to the necessity of any scale. Rather, the proportionality, scale, size, shape, form, function, and/or other feature of the disclosed embodiments can be altered without necessarily departing from the scope of this disclosure (unless such feature is expressly described herein as essential).

Furthermore, as indicated above, in the exemplary embodiments illustrated in the figures, like structures will be provided with similar reference designations, where possible. Specific language will be used herein to describe the exemplary embodiments. Nevertheless it will be understood that no limitation of the scope of the disclosure is thereby intended. Rather, it is to be understood that the language used to describe the exemplary embodiments is illustrative only and is not to be construed as limiting the scope of the disclosure (unless such language is expressly described herein as essential).

Alterations and further modifications of the inventive features illustrated herein, and additional applications of the principles illustrated herein, which would occur to one skilled in the relevant art and having possession of this disclosure, are to be considered within the scope of this disclosure. Unless a feature is described as requiring another feature in combination therewith, any feature herein may be combined with another feature of a same or different embodiment disclosed herein. Furthermore, various well-known aspects of illustrative systems, methods, apparatus, and the like are not described herein in particular detail in order to avoid obscuring aspects of the example embodiments.

Reference will now be made to the figures to describe various aspects of example embodiments of the disclosure. FIG. 1 depicts a grilling device 100 having an oven section 102, an optional support element 160 (e.g., supporting oven section 102 above the ground), a hopper 170 for delivering fuel (e.g., wood pellets) into oven section 102, and/or one or more utility shelves 180. Oven section 102 can have an outer wall 104 at least partially bounding an internal grilling compartment 106 and having an access opening 108 disposed therein. Oven section 102 can also have a lid 110 that selectively covers access opening 108 and/or that can be selectively actuatable between an opened position (FIG. 1) and a closed position (not shown).

Figure 2:
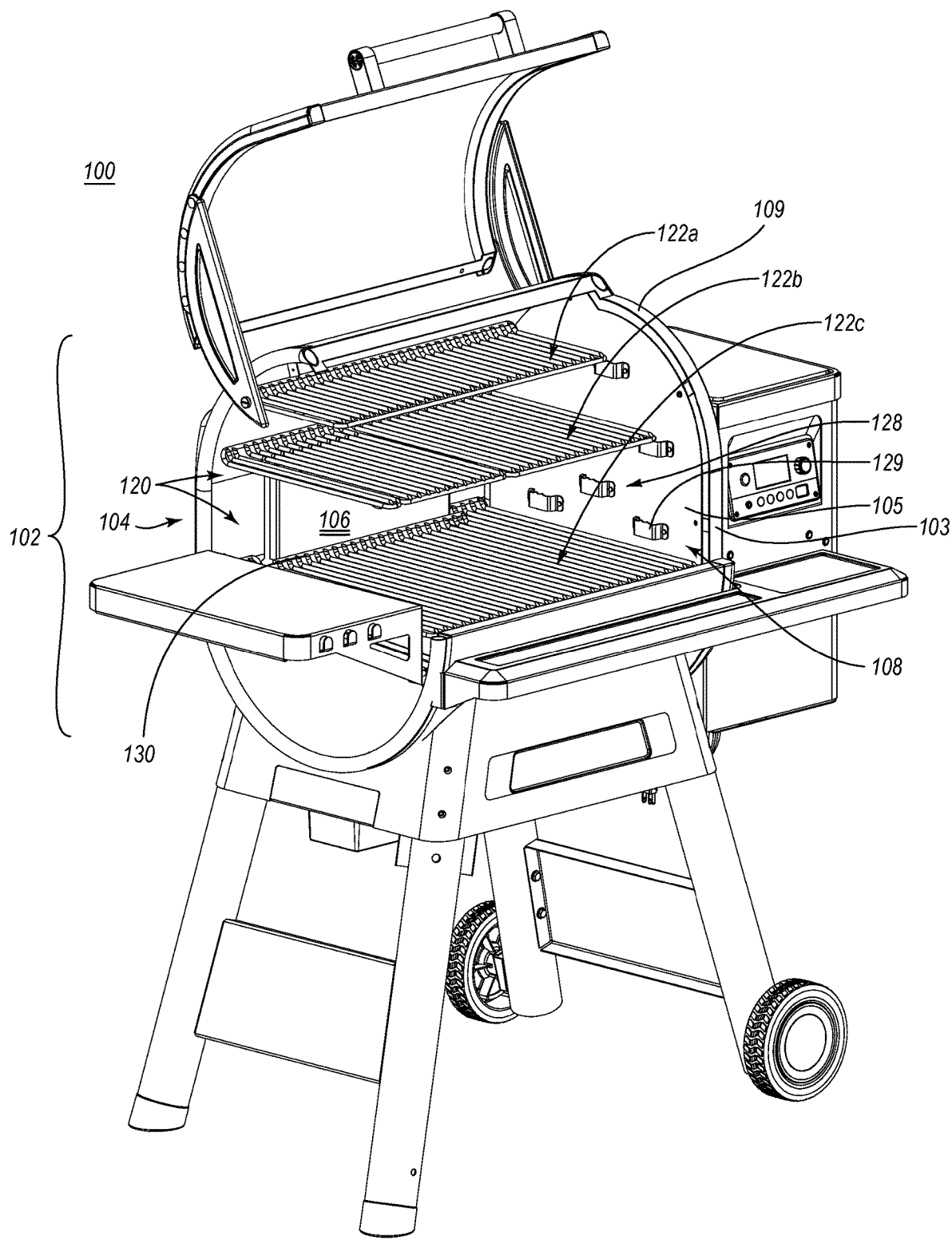
FIG. 2 illustrates a schematic showing a partial cut-away thereof.

Grilling device 100 and/or oven section 102 thereof can also comprise a multi-tiered grill rack system 120 having a plurality of grill racks 122 and a mounting assembly 128. As shown in FIG. 2, for instance, mounting assembly 128 can include a plurality of grill rack mounting elements 129 connected to an inner surface 105 of outer wall 104 and/or defining a plurality of (e.g., three) tiers. As depicted in the figures, grill rack mounting elements 129 comprise brackets attached to inner surface 105 of outer wall 104. It will be appreciated, however, that one or more of the grill rack mounting elements 129 can comprise a channel, rail, track or other suitable mounting element.

An upper grill rack 122a can be disposed in an upper, first tier, and intermediate grill rack 122b can be disposed in an intermediate, second tier, and a lower grill rack 122c can be disposed in a lower, third tier. One or more grill racks 122 (e.g., upper grill rack 122a and intermediate grill rack 122b) can be supported and/or suspended by grill rack mounting elements 129. In some embodiments, the grilling device 100 may include multiple grill rack mounting elements 129, some or all of which may be used to support grill racks 122. Indeed, more grill rack mounting elements may be provided than there are grill racks, in a given grilling device.

For example, in a three-tiered grill rack system, four, five, six or more sets of grill rack mounting elements 129 may be provided. These additional grill rack mounting elements 129 may provide a greater amount of flexibility to the user when placing grill racks. Still further, at least in some cases, the grill rack mounting elements 129 may be adjustable up or down. In this manner, the compartment may be fully customizable to the user.

One or more grill racks 122 (e.g., lower grill rack 122c) can be supported and/or suspended by an additional mounting element in certain embodiments. For instance, inner surface 105 of outer wall 104 can have one or more ledges or lips 127 extending partially into internal grilling compartment 106 (see e.g., FIG. 3C). The one or more ledges or lips 127 can extend from a front portion(s), side portion(s), and/or rear portion(s) of inner surface 105 such that one or more grill racks 122 can be supported thereon. For instance, a portion (e.g., outer edge) of lower grill rack 122c can rest on or be supported by the one or more ledges or lips 127 (as shown in FIG. 3C). It is also noted that various internal features (e.g., heat and/or smoke circulating element(s), etc.) may necessitate a break in the one or more ledges or lips. Accordingly, inner surface 105 of outer wall 104 can have one or more divided ledges or lips extending partially into internal grilling compartment 106.

As further depicted in FIG. 2, one or more grill racks 122 can have a rear lip or raised edge configuration 130. Such a configuration may prevent and/or inhibit food products from sliding off the back of grill rack 122. In addition, outer wall 104 (or side wall panel thereof) can have a pill or oval (cross-sectional shape) (e.g., with a rounded and/or curved top portion or edge 109 and an elongated (central) straight and/or linear portion or edge 103. Accordingly, unlike existing barrel-shaped grills having a round, circular cross-sectional shape from a side view, the ovular shape of oven section 102 provides a substantially taller internal grilling compartment 106 and access opening 108, and thus provides a substantially higher amount of additional grilling height (i.e., top-to-bottom) for a food product to be placed therein (e.g., without increasing the depth (i.e., front-to-back) of the grilling device 100).

However, the rounded and/or curved top portion or edge 109 is substantially recessed relative to the elongated (central) straight and/or linear portion or edge 103. Accordingly, while lower grill rack 122c can extend from the rear of internal grilling compartment 106 to the front thereof at a deeper point corresponding to elongated (central) straight and/or linear portion or edge 103, upper grill rack 122a may be shorter or smaller (front-to-back) than lower grill rack 122c because of its location corresponding to rounded and/or curved top portion or edge 109.

In addition, intermediate grill rack 122b may be disposed at a height between upper grill rack 122a and lower grill rack 122c, and likewise have a depth (front-to-back) that is between the depths of upper grill rack 122a and lower grill rack 122c. Accordingly, the grill rack system may have an opera-house or stadium seating-type configuration with each of the upper levels having a progressively shorter or smaller depth (front-to-back) and/or a progressively recessed front and/or rear edge (compared to the grill rack immediately therebelow). In other words, lower grill rack 122c may be larger than intermediate grill rack 122b, which may be larger than upper grill rack 122a.

Such configurations may permit and/or allow for a suitable amount of cooking area between the upper surface of a lower grill rack and the lower surface of an upper grill rack. For instance, such configurations may permit and/or allow for flipping and/or rotating of food products without the substantial risk of touching an adjacent grill rack and/or being burned thereby. It is noted, however, that each of the grill racks 122 can have substantially the same width or length (side-to-side) and/or height (i.e., top-to-bottom).

Figure 3A:
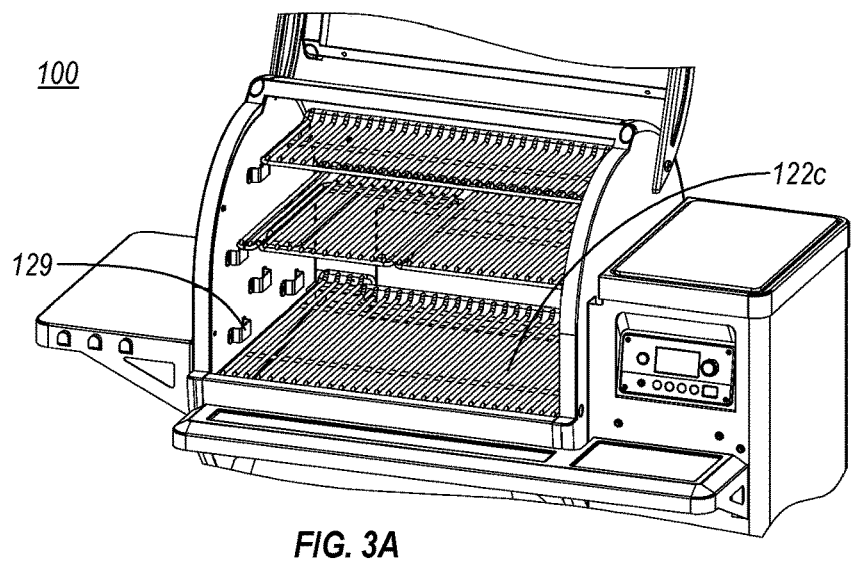
FIGS. 3A-3C illustrate detailed views thereof in a plurality of configurations.
Figure 3B:
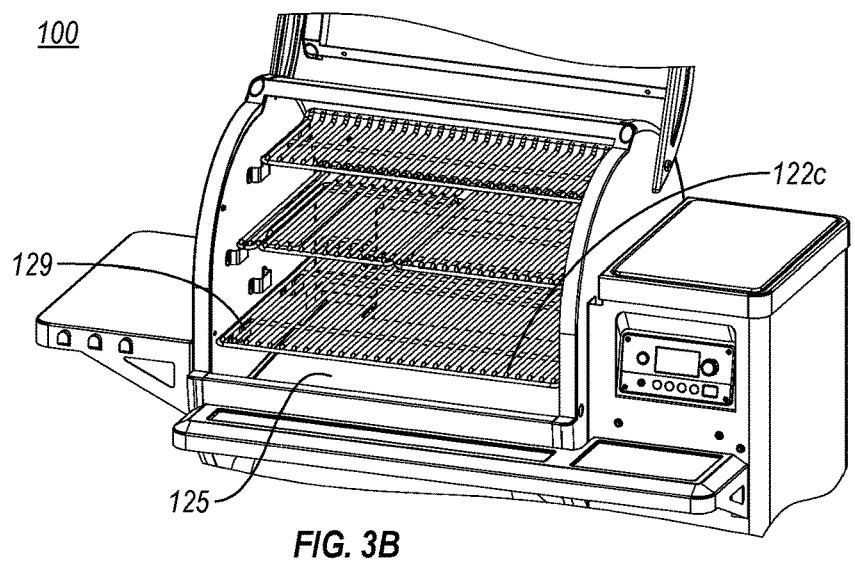
Figure 3C:
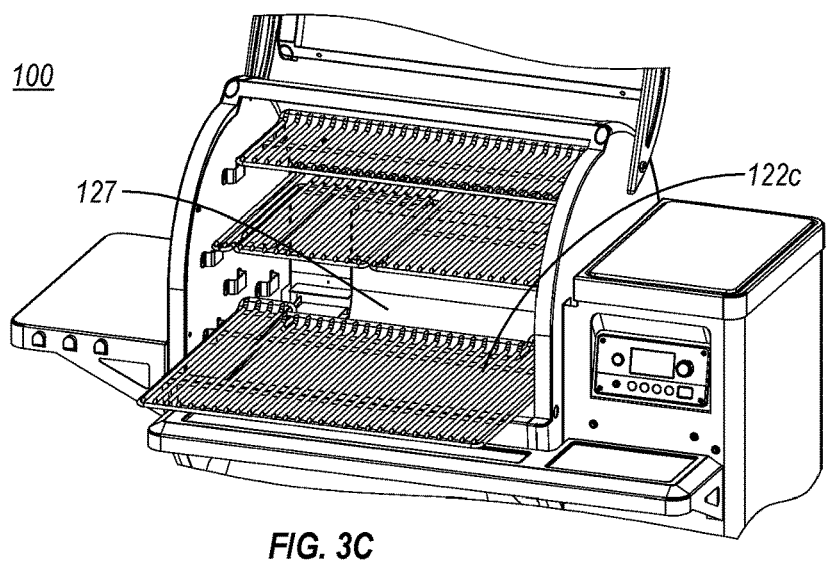

As illustrated in FIGS. 3A-3C, one or more of the grill racks 122 can be re-configurable and/or re-positionable (e.g., on-demand). For instance, grill rack 122c can be disposed in a lower position of the third tier as illustrated in FIG. 3A, with grill rack 122c supported by one or more ledges or lips 127 (see e.g., FIG. 3C). Grill rack 122c can also be disposed in an upper position of the third tier as illustrated in FIG. 3B, with grill rack 122c supported by one or more grill rack mounting elements 129. In some embodiments, the upper position can be disposed vertically above the lower position.

For instance, the lower position can comprise a direct heating position, where a food product placed on grill rack 122c in the lower position can be exposed to direct and/or radiant heat from a heating source (not shown) disposed within grilling device 100 (e.g., in a bottom portion of the grilling compartment or oven section thereof). The heating source can be fed a fuel source (e.g., wood pellets) by means of an auger disposed between the fuel source and the hopper. In some embodiments, the food product placed on grill rack 122c in the lower position can be exposed to flames produced by the heating element.

In other embodiments, a heat shield and/or drip pan 125 can be disposed between the fuel source and grill rack 122c. The heat shield and/or drip pan 125 can absorb, conduct, and/or radiate heat from the heating element such that the food product placed on grill rack 122c can be cooked thereby. Alternatively, the food product can be placed directly on the heat shield and/or drip pan 125. For instance, grill racks 122b and/or 122c can be removed in some embodiments.

As illustrated in FIGS. 3B and 3C, lower grill rack 122c can also be slidable and/or movable between a retracted position (FIG. 3B) and a protruding position (FIG. 3C). For instance, in some embodiments, grill rack 122c can be supported by a plurality of (e.g., two, three, or more) grill rack mounting elements 129. The grill rack mounting elements 129 can comprise brackets, as illustrated, or rails, tracks, etc. Alternatively, grill rack 122c can be supported by one or more ledges or lips 127.

In either case, lower grill rack 122c can slide along one or more components of mounting assembly 128 (e.g., grill rack mounting elements 129 and/or lips 127) such that in the protruding position, at least a portion of lower grill rack 122c extends out of internal grilling compartment 106 and/or beyond access opening 108 (see FIG. 1). As illustrated in FIG. 3C, a plurality of lower grill rack mounting elements 129 can support grill rack 122c from beneath the grill rack, and at least one grill rack mounting element 129 can be disposed above lower grill rack 122c (e.g., providing and/or serving as a catch to prevent over protrusion and/or rotation of grill rack 122c).

Figure 4:
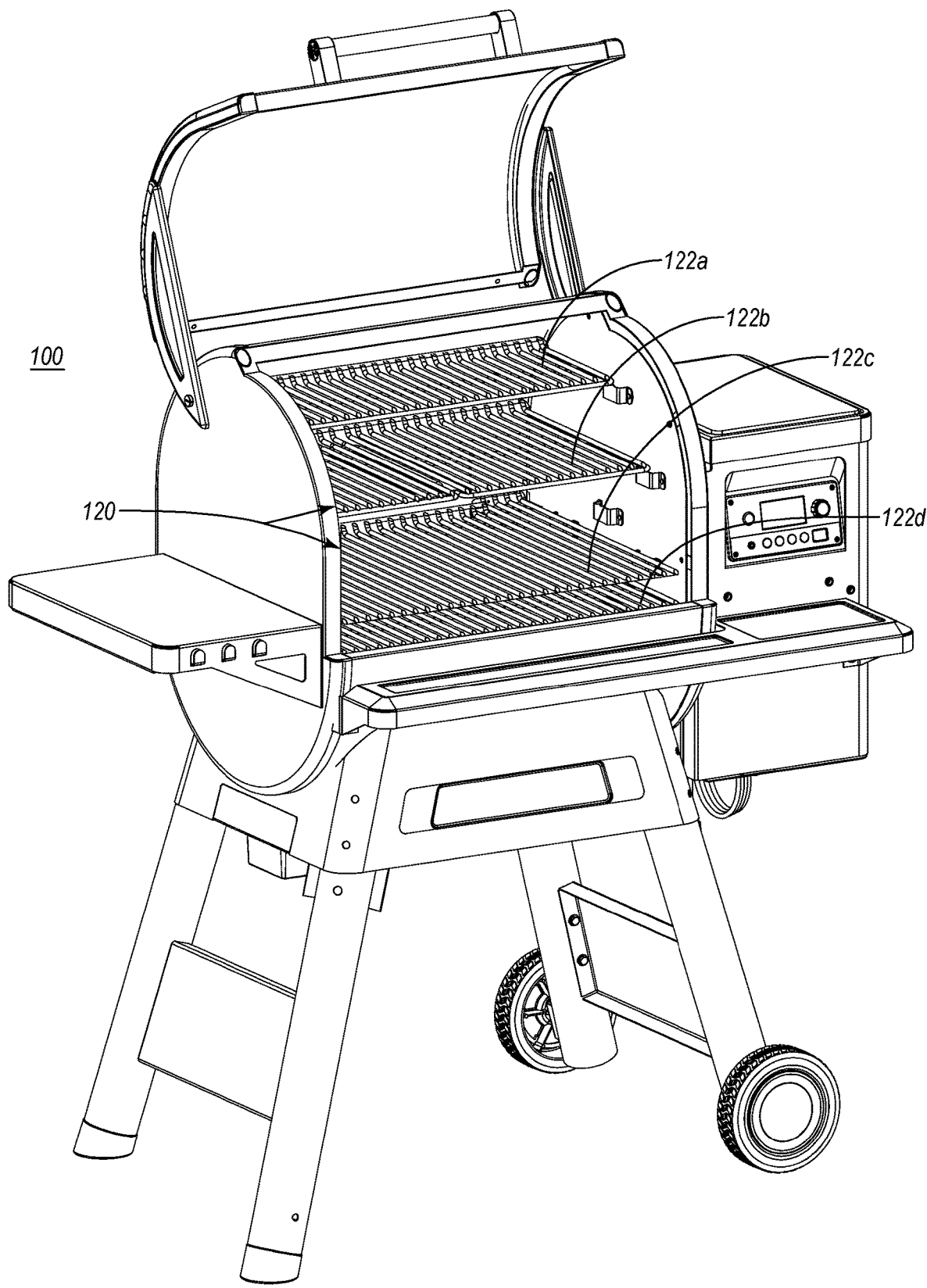
FIG. 4 illustrates a perspective view thereof in an expanded configuration.
Figure 5A:
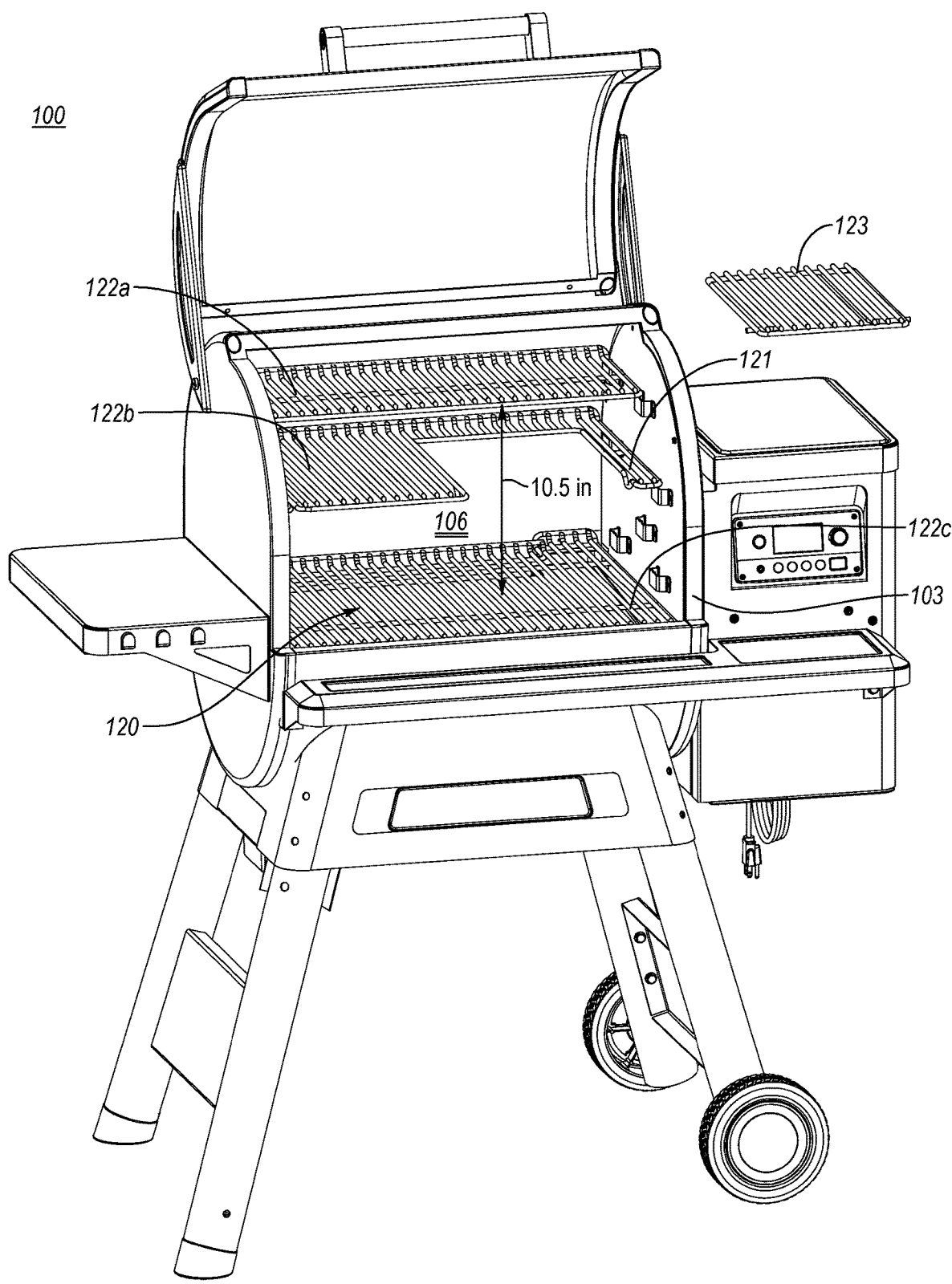
FIG. 5A illustrates a perspective view of a grilling device having a three-tiered grill rack system with a removable section according to an implementation of the present disclosure.
Figure 7A:
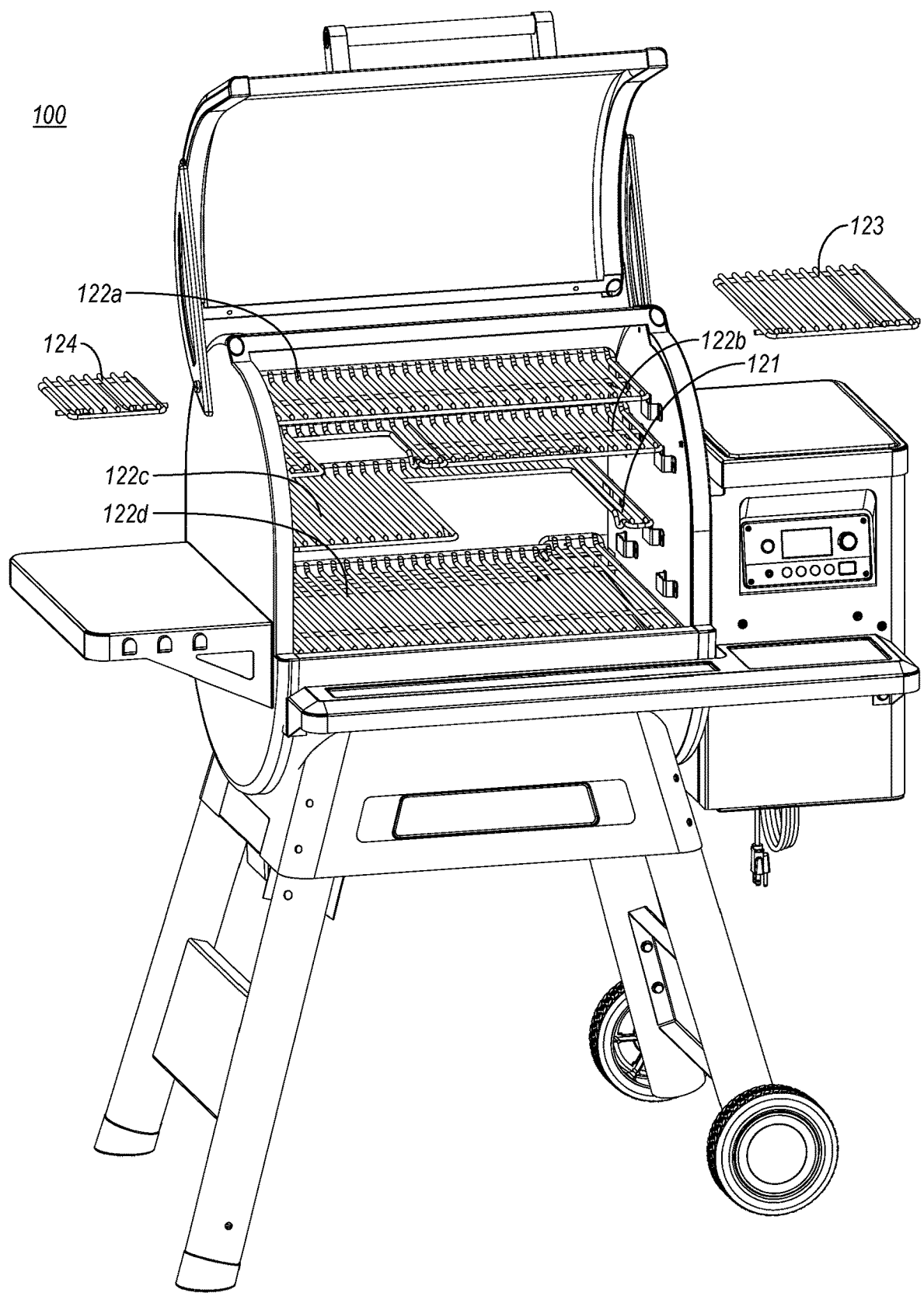
FIG. 7A illustrates a perspective view of a grilling device having a four-tiered grill rack system with multiple removable sections according to an implementation of the present disclosure.

In one or more embodiments, multi-tiered grill rack system 120 can include a fourth grill rack 122d (as shown in FIGS. 4 and 7A). Grill rack 122d can be disposed in the lower position of the third tier while grill rack 122c is disposed in the upper position thereof. Alternatively, the lower position can comprise a fourth tier in some embodiments. Furthermore, one or more of the grill racks 122 can include a selectively removable component. For instance, as illustrated in FIG. 5A, intermediate grill rack 122b can comprise a frame component 121 and a selectively removable component 123. In at least some embodiments, removal of selectively removable component 123 can permit a larger and/or taller food product or item to be placed on lower grill rack 122c and still fit within internal grilling compartment 106.

In one embodiment, a grilling device 100 is provided which includes an oven section 102. The oven section 102 has an internal grilling compartment 106 that is at least partially bound by an outer wall 104. The grilling device 100 also includes a multi-tiered grill rack system 120. This multi-tiered grill rack system 120 is disposed within the internal grilling compartment 106, and includes at least three grill racks (e.g. 122a-c), although more grill racks are possible. Indeed, four, five, six or more grill racks may be included in a single grilling device.

The grilling device 100 also includes a mounting assembly 128 for supporting the grill racks within the internal grilling compartment 106. The mounting assembly 128 includes multiple grill rack mounting elements 129. These grill rack mounting elements 129 are placed at various positions on each of the inner surfaces 105 of the outer wall 104. The grill rack mounting elements 129 may be arranged or spaced in a variety of different places on the inner surface 105. The grill rack mounting elements 129 may be fixed or may be adjustable. For example, the grill rack mounting elements may be configured to adjust upward or downward to accommodate different foods or different placements of the grill racks 122.

In some cases, the grill racks 122 are arranged in a vertically spaced relationship within the multi-tiered grill rack system 120. As shown in FIG. 5A, grill racks 122a, 122b and 122c are arranged in a vertically spaced relationship, where upper grill rack 122a is placed vertically over middle grill rack 122b, and both of which are placed vertically over lower grill rack 122c. The grill racks 122 are placed in the oven section 102 of the grilling device 100. The oven's outer wall 104 bounds the internal grilling compartment 106. This internal grilling compartment is accessible to a grill user via the hinged lid 110 which is selectively operable between an open and a closed position.

The outer wall 104 of the oven section 102 includes opposing first and second side portions and an encircling body portion extending between the opposing first and second side portions. The encircling body portion's inner surfaces, along with the side portions' inner surfaces 105 define the oven section 102 in which the food is grilled or smoked. The body portion includes an access opening 108 that is selectively covered using the lid 110. The lid 110 is attached to a specific portion of the outer wall 104. This portion may be behind the apex of the outer wall 104, especially in cases where the outer wall is oval shaped.

In cases where the outer wall is oval-shaped, the lid is formed to match the curves and edges (103 & 109) of the outer wall to form a seal when the lid 110 is closed. Upon actuating the lid 110 to a closed position, the seal formed by the curvature of the lid 110 acts to entrap the heat and/or smoke created by the grill's heat and/or smoke source.

The grill racks 122 of the multi-tiered grill rack system 120 may have the same or different depths. For example, the multi-tiered grill rack system 120 may include a third grill rack 122c having a first depth, a second grill rack 122b disposed above the third grill rack 122c and having a second depth that is smaller than the first depth, and a first grill rack 122a that is disposed above the second grill rack 122b and has a third depth that is smaller than the second depth. Accordingly, as shown in FIG. 5A, grill rack 122c may be placed at or near the bottom of the multi-tiered grill rack system 120, intermediate grill rack 122b may be placed at or near the middle of the multi-tiered grill rack system 120, and upper grill rack 122a may be placed at or near the top of the multi-tiered grill rack system 120. These racks are, of course, removable and interchangeable to at least some extent, although larger racks may not fit on the higher portions of the grill without impeding actuation of the lid 110.

The multi-tiered grill rack system 120 also includes a mounting assembly 128 for supporting the at least three grill racks 122a-122c in a vertically spaced configuration. The mounting assembly includes multiple grill rack mounting elements 129 connected to an inner surface 105 of the outer wall 104. These grill rack mounting elements 129 hold the grill racks securely in place during operation of the grill, and further allow removal and replacement of the grill racks as desired.

In some embodiments, the grilling device 100 includes grill racks 122 that have at least one selectively removable component. For example, as shown in FIG. 5A, the grilling rack 122b has a selectively removable component 123. The selectively removable component 123 may be removed or replaced at any time by a grill user. The selectively removable component 123 attaches to a frame component 121 of the grill rack. The selectively removable component 123 of the intermediate grill rack 122b may be of substantially any length or depth in relation to the frame component 121.

For instance, the embodiment illustrated in FIG. 5A shows that, in this embodiment, the selectively removable component 123 is approximately half of the width of the intermediate grill rack 122b. It will be understood that the selectively removable component 123 may be one-fourth, three-fourths, nine-tenths or any other fraction of the grill rack. Still further, while only one selectively removable component 123 is shown in FIG. 5A, substantially any number of selectively removable components 123 may be included in a given grill rack or multi-tiered grill rack system 120. The selectively removable component 123 is supported by the remaining portion of the grill rack.

Figure 5B:
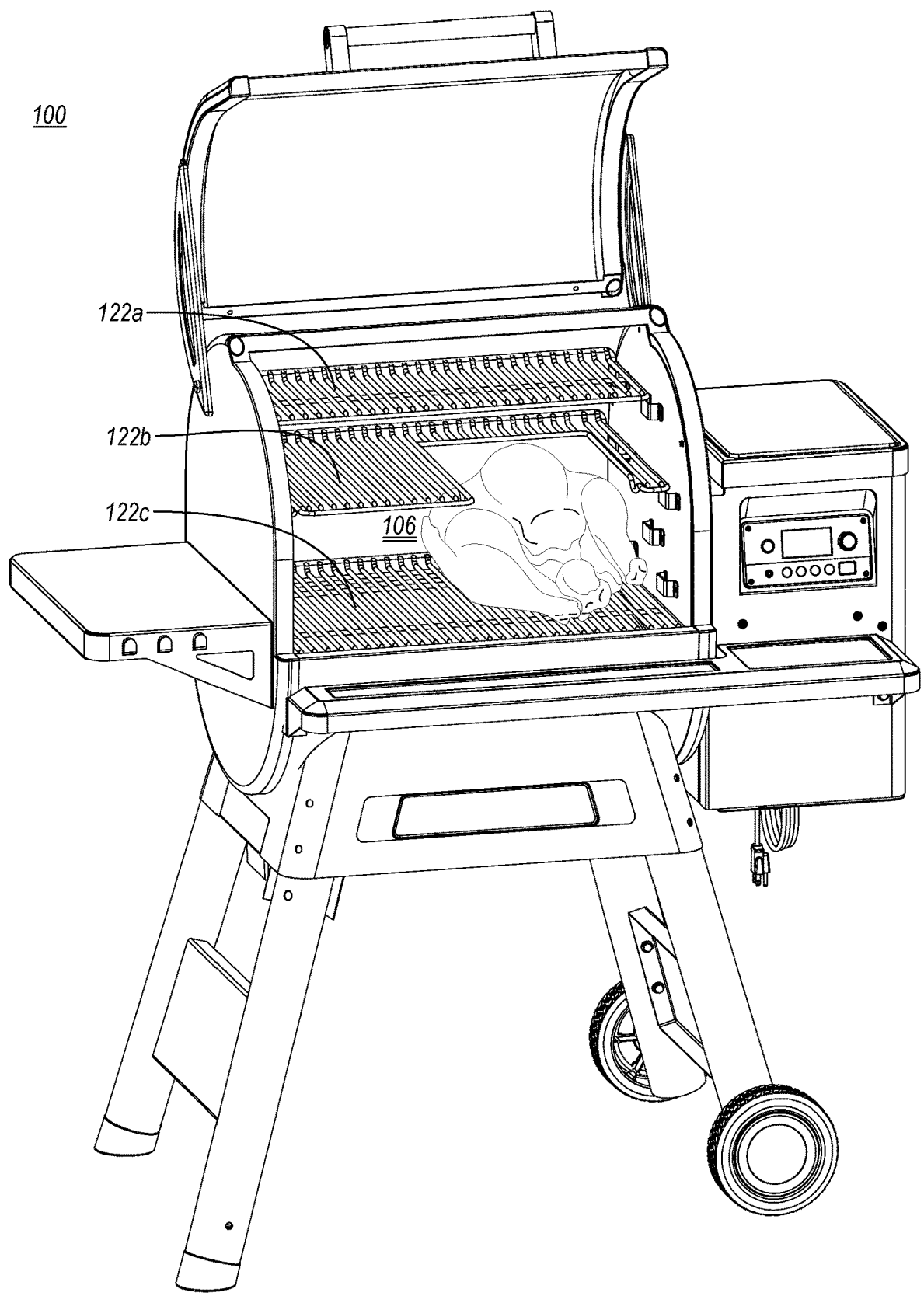
FIG. 5B illustrates a perspective view of a grilling device having a three-tiered grill rack system with a removable section and food placed therein according to an implementation of the present disclosure.

Allowing the grill racks 122 to have selectively removable components 123 provides increased flexibility when preparing food in the grill. For example, as shown in FIG. 5B, a turkey may be placed on the bottom grill rack 122c, and the turkey may extend into the middle grill rack 122b. The turkey extends into the space that would have otherwise been occupied by the removed selectively removable component 123. Thus, in this manner, a grill user may be able to cook substantially larger food items, or may be able to stack or move the food items in ways not previously possible, as the food items may extend into the space normally occupied by the upper racks.

Figure 6A:
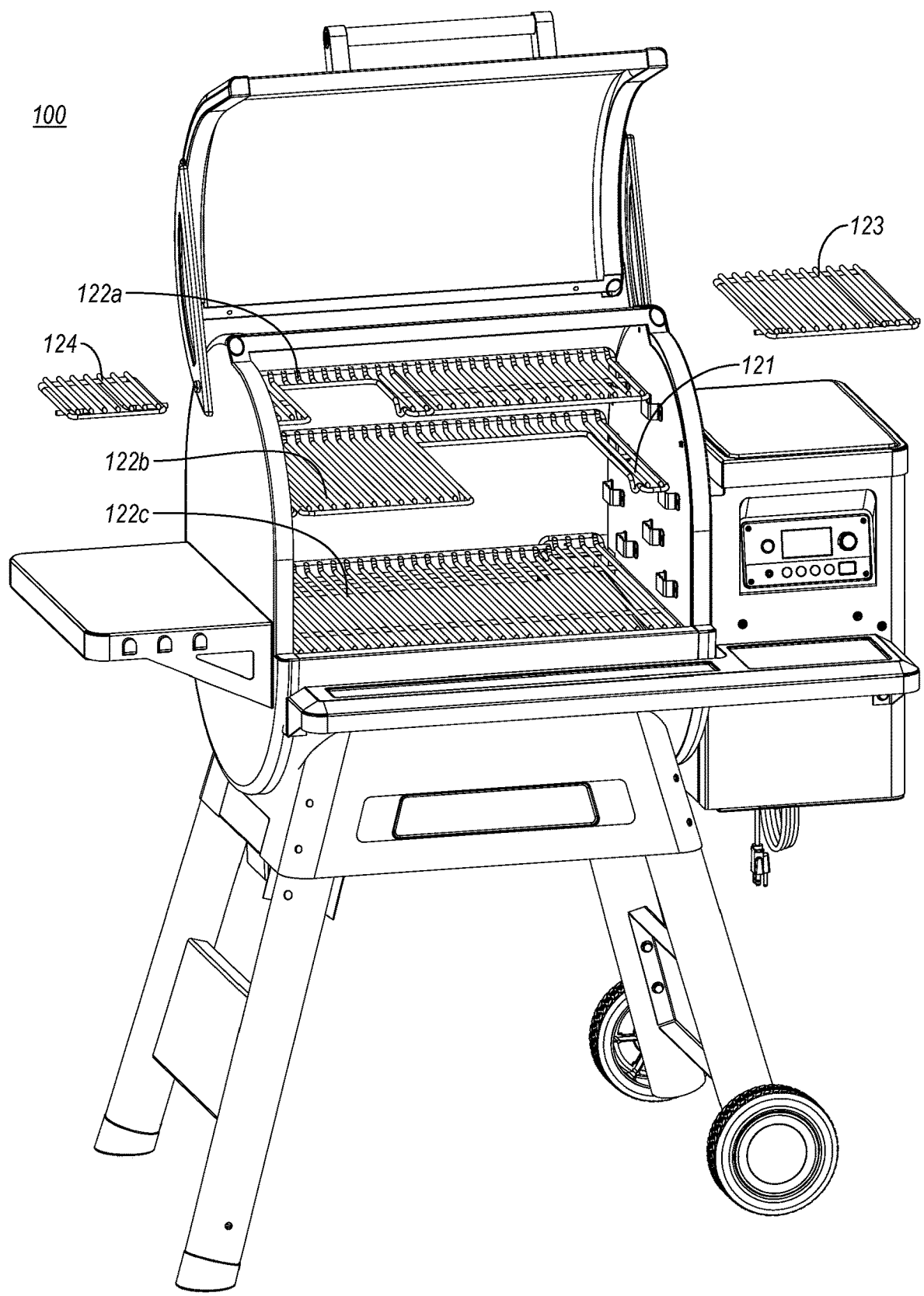
FIG. 6A illustrates a perspective view of a grilling device having a three-tiered grill rack system with multiple removable sections according to an implementation of the present disclosure.

In some cases, as shown in FIG. 6A, multiple grill racks 122 may have selectively removable components 123. In the grilling device 100 of FIG. 6A, the middle grilling rack 122b has a selectively removable component 123, and the upper grill rack 122a also has a selectively removable component 124. This allows larger foods to be placed on the right side of the lower grill rack 122c, and on the left side of intermediate grill rack 122b. The food placed in the right side of the lower grill rack 122c can extend into the space that would have been occupied by the selectively removable component 123 of intermediate grill rack 122b, and the food placed in the left side of the middle grill rack 122b can extend into the space that would have been occupied by the selectively removable component 124 of upper grill rack 122a.

Figure 6B:
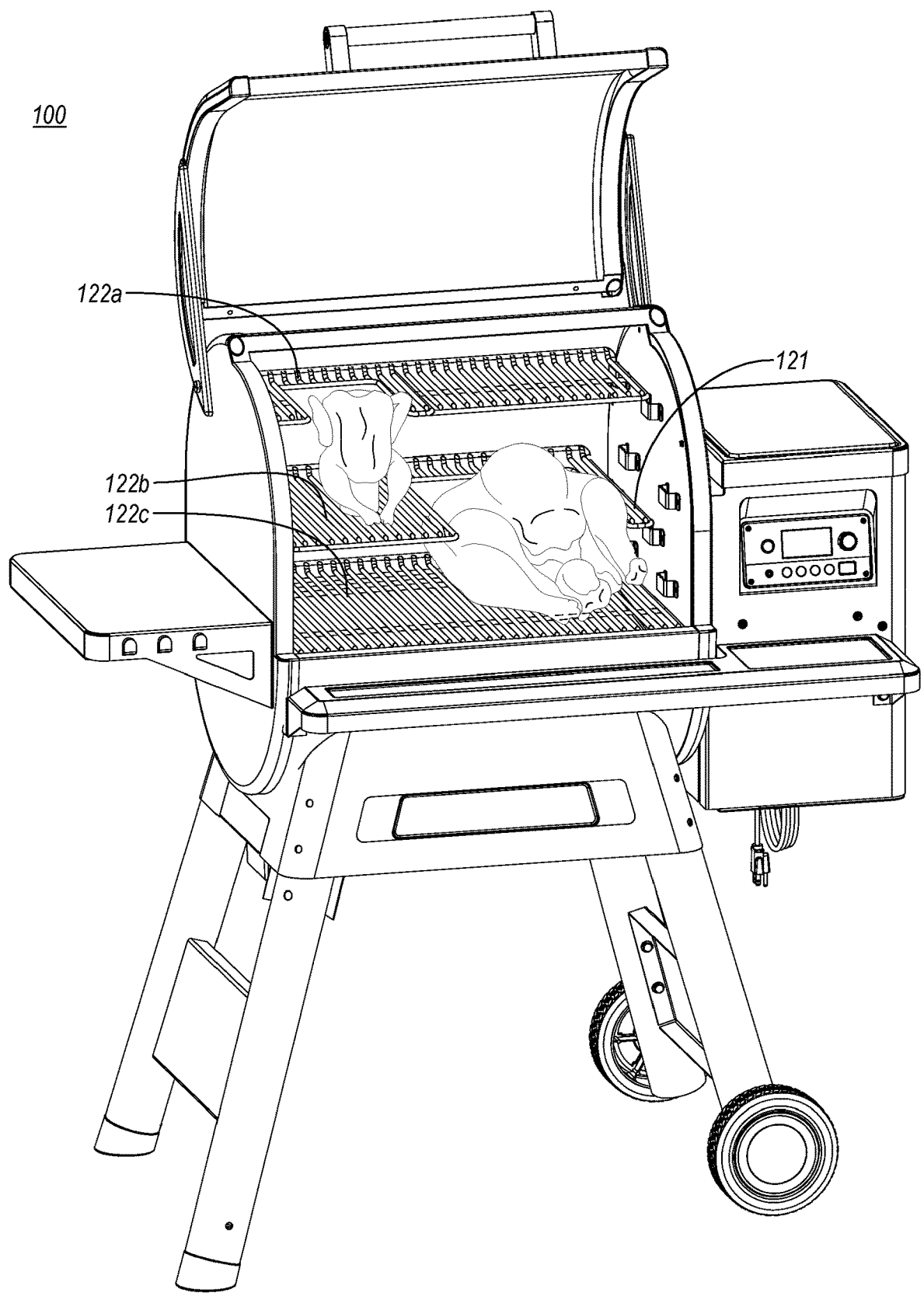
FIG. 6B illustrates a perspective view of a grilling device having a three-tiered grill rack system with multiple removable sections and food placed therein according to an implementation of the present disclosure.

Thus, as shown in FIG. 6B, a turkey may be placed on lower grill rack 122c and may extend into the space of the selectively removable component 123, and a beer can chicken can be placed on intermediate grill rack 122b and may extend into the space of the selectively removable component 124 of upper grill rack 122a. It will be understood, of course, that these food items are merely examples of many different larger food items that a user may want to grill. Using the selectively removable components, a user may place multiple food items higher or lower in the grill as desired.

For instance, as shown in FIGS. 4 and 7, in cases where two lower level racks are being used (122c and 122d), the lower grill rack 122c may have a selectively removable component 123 on the right side which may be removed, allowing lower-profile food items to be placed on the left sides of both grill racks 122c and 122d. Then, both of these racks (122c & 122d) would hold food items (such as hamburgers) closer to the heat source, while still allowing for a higher-profile food item to be placed on the right side.

A further embodiment is provided in which a multi-tiered grill rack system 120 is provided. The multi-tiered grill rack system 120 includes multiple grill racks 122, including a third grill rack 122c having a third depth, a second grill rack 122b that has a second depth that is smaller than the third depth, and a first grill rack 122a that has a first depth that is smaller than the second depth. In this manner, the grill racks are disposed within the oven section 102 of the grilling device in a tiered, stadium-seating manner, where the lowest grilling rack has the greatest depth, the middle racks have a smaller depth, and the higher racks have the smallest depth. The multi-tiered grill rack system 120 also includes a mounting assembly 128 for supporting the grill racks 122 in a vertically spaced configuration.

The grill racks 122 may each have substantially the same width, or may have varying widths. The multi-tiered grill rack system 120 may include grill racks that have selectively removable components 123. The selectively removable components 123 of the multi-tiered grill rack system 120 may include at least one selectively removable component that is supported by the remaining portion of the grill rack. Thus, as shown in FIG. 5A, the selectively removable components 123 are supported by the frame component 121 of the intermediate grill rack 122b. When the selectively removable component 123 is removed from the multi-tiered grill rack system 120, the remainder of the grill rack (i.e. the frame component 121) remains in the grilling device 100.

Even in cases where a grilling rack includes multiple selectively removable components, the remaining frame component 121 stays within the grilling device, and provides support for food items placed on the intermediate grill rack 122b, and further provides support for the selectively removable component(s) 123 when they are returned to their position in the grilling rack. When the selectively removable components 123 are returned to the grilling rack, they may slide, snap and/or lock into place so that they are secured and usable for grilling.

In the embodiment shown in FIG. 5, the selectively removable component 123 is on the middle grill rack 122b. As such, food items that are placed on the bottom grill rack 122c below the middle grill rack can extend past the remaining portion of the middle grill rack 122b. In some cases, the mounting assembly 128 substantially prevents sliding of the grill racks once the grill racks are inserted into the grill rack mounting elements 129. In other cases, the mounting assembly 128 permits sliding of the grill racks in opposing first and second directions. For instance, the mounting assembly may permit sliding of the grill racks front to back, but may not permit movement of the grill racks side to side. Thus, the grill rack mounting elements 129 may hold the grilling racks in place during use, and may further hold the grilling rack frame component 121 in place whenever a selectively removable component 123 is removed.

A further grilling device 100 may be provided which includes an oven section 102 that has an outer wall 104 which bounds the internal grilling compartment 106. The outer wall 104 has opposing first and second side portions, as well as an encircling body portion that extends between the side portions. The body portion has an access opening and a lid 110 attached to the outer wall 104 which is actuatable between a closed position in which the lid covers the access opening and an open position in which the access opening is uncovered. The lid 110 may have a handle attached thereto that allows for actuation of the lid.

This grilling device 100 also includes a multi-tiered grill rack system 120 that itself includes multiple grill racks 122 disposed in the internal grilling compartment 106. The grilling racks include a third grill rack 122c that has a first depth, a second grill rack that is disposed above the first grill rack and has a second depth which is smaller than the first depth, and a third grill rack that is disposed above the second grill rack and has a third depth which is smaller than the second depth. The grilling device also includes a mounting assembly 128 for supporting the grill racks 122 in a vertically spaced configuration. The mounting assembly includes multiple grill rack mounting elements 129 connected to an inner surface 105 of the outer wall 104.

The grill rack mounting elements are connected to the opposing first and second side portions of the outer wall 104 using some type of fastening means. The mounting assembly 128 may include ledges that extend from the inner surface 105 of the outer wall 104. These ledges provide support for the grill racks 122. In some embodiments, the first and second side portions may have a substantially oval configuration with an upper curved edge 109, an opposing lower curved edge, and opposing linear side edges 103 extending between the upper and lower curved edges. The respective front edges of the grill racks 122 may be progressively recessed compared to an adjacent lower grill rack.

Figure 7B:
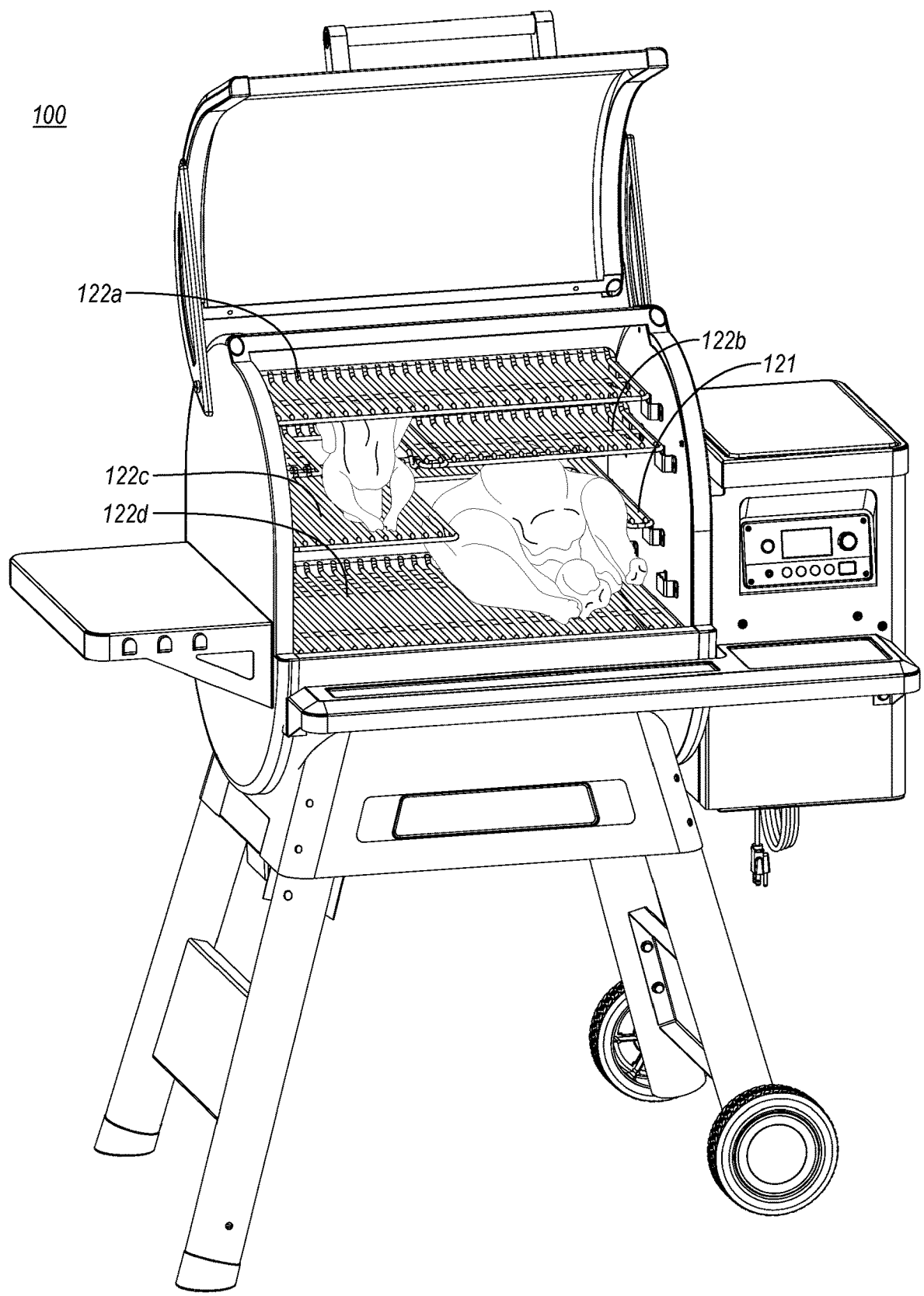
FIG. 7B illustrates a perspective view of a grilling device having a four-tiered grill rack system with multiple removable sections and food placed therein according to an implementation of the present disclosure.

In some cases, as shown in FIGS. 7A and 7B, four or even more grilling racks may be placed in such a grilling device. For instance, the grilling device 100 of FIG. 7A may include four grilling racks 122a-122d. Two or more of these grilling racks may include a removable grill rack insert (i.e. selectively removable component 123). This selectively removable component 123 allows food items placed on the lower grill racks to extend up through the higher grill racks.

Thus, as shown in FIG. 7B, large food items such as turkeys and beer can chickens can be placed on lower racks and can extend into the higher racks, while still allowing food to be cooked on the higher racks. That is, instead of having to remove the upper racks entirely to make room for the larger food items, portions of the grilling rack can remain in position, while other portions are removed. This allows a great deal of flexibility and customizability when preparing food in grilling device 100.

The foregoing detailed description makes reference to specific exemplary embodiments. However, it will be appreciated that various modifications and changes can be made without departing from the scope contemplated herein and as set forth in the appended claims. In particular, while illustrative exemplary embodiments in this disclosure have been more particularly described, the present disclosure is not limited to these embodiments, but includes any and all embodiments having modifications, omissions, combinations (e.g., of aspects across various embodiments), adaptations and/or alterations as would be appreciated by those in the art based on the foregoing detailed description. The limitations in the claims are to be interpreted broadly based on the language employed in the claims and not limited to examples described in the foregoing detailed description, which examples are to be construed as non-exclusive.

Moreover, any steps recited in any method or process described herein and/or recited in the claims may be executed in any order and are not necessarily limited to the order presented in the claims, unless otherwise stated (explicitly or implicitly) in the claims. Accordingly, the scope of the invention should be determined solely by the appended claims and their legal equivalents, rather than by the descriptions and examples given above.

It will also be appreciated that various features, members, elements, parts, and/or portions of certain embodiments of the present invention are compatible with and/or can be combined with, included in, and/or incorporated into other embodiments of the present invention. Thus, disclosure of certain features, members, elements, parts, and/or portions relative to a specific embodiment of the present invention should not be construed as limiting application or inclusion of said features, members, elements, parts, and/or portions to the specific embodiment.

Rather, it will be appreciated that other embodiments can also include said features, members, elements, parts, and/or portions without necessarily departing from the scope of the present invention. Likewise, certain embodiments can include fewer features than those disclosed in specific examples without necessarily departing from the scope of this disclosure.

In addition, the present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

We claim:

1. A grilling device, comprising:
an oven section comprising an outer wall at least partially defining an internal grilling compartment, the outer wall comprising:
two opposing sidewalls having elongated oval shapes; and
an encircling body wall extending between the two opposing sidewalls, the two opposing sidewalls and the encircling body wall defining an access opening;
a lid mounted to the two opposing sidewalls and having an inner surface having an overall curvature at least substantially matching portions of outer peripheral edges of the two opposing sidewalls defining the access opening, wherein the inner surface is configured to abut against and form a seal with the at least substantially matching portions of outer peripheral edges of the two opposing sidewalls; and
a grill rack system disposed in the internal grilling compartment, the grill rack system comprising at least three grill racks and a plurality of grill rack mounting elements for supporting the grill racks within the internal grilling compartment.

2. The grilling device of claim 1, wherein the grill racks are arranged in a vertically spaced relationship within the grill rack system.

3. The grilling device of claim 1, wherein the lid is actuatable between a closed position in which the lid covers the access opening and an open position in which the access opening is uncovered.

4. The grilling device of claim 1, wherein the at least three grill racks of the grill rack system comprises:
a first grill rack having a first depth;
a second grill rack disposed above the first grill rack and having a second depth, the second depth being smaller than the first depth;
a third grill rack disposed above the second grill rack and having a third depth, the third depth being smaller than the second depth; and
the plurality of grill rack mounting elements for supporting the at least three grill racks in a vertically spaced configuration, the plurality of grill rack mounting elements connected to an inner surface of the outer wall.

5. The grilling device of claim 4, wherein at least one grill rack of the first grill rack, the second grill rack, or the third grill rack includes a selectively removable component that is supportable by a remaining portion of the at least one grill rack.

6. The grilling device claim 5, wherein the at least one grill rack that includes the selectively removable component is on the second grill rack, such that food items placed on the first grill rack below the second grill rack can extend past the remaining portion of the second grill rack.

7. The grilling device of claim 1, wherein at least one grill rack of the at least three grill racks includes a selectively removable component.

8. The grilling device of claim 7, wherein the selectively removable component is supportable by a remaining portion of the at least one grill rack.

9. The grilling device of claim 1, wherein the at least three grill racks each have substantially the same width.

10. The grilling device of claim 1, wherein the plurality of grill rack mounting elements are configured to substantially prevent sliding of at least one grill rack of the at least three grill racks in one or more directions.

11. The grilling device of claim 1, wherein the plurality of grill rack mounting elements are configured to permit sliding of at least one grill rack of the at least three grill racks in opposing first and second directions.

12. A grilling device, comprising:
an oven section comprising an outer wall at least partially defining an internal grilling compartment, the outer wall having opposing:
a first sidewall having an elongated oval shape;
a second opposing sidewall having an elongated oval shape; and
an encircling body wall extending between the first sidewall and the second opposing sidewall, the first sidewall, the second opposing sidewall, and the encircling body wall defining an access opening;
a lid mounted to the first sidewall and the second opposing sidewall of the outer wall and having an inner surface having an overall curvature at least substantially matching portions of outer peripheral edges of the first sidewall and the second opposing sidewall defining the access opening, wherein the inner surface is configured to abut against and form a seal with the at least substantially matching portions of outer peripheral edges of the first sidewall and the second opposing sidewall, and wherein the lid is actuatable between a closed position in which the lid covers the access opening and an open position in which the access opening is uncovered; and
a grill rack system disposed in the internal grilling compartment, the grill rack system comprising at least three grill racks and a plurality of grill rack mounting elements for supporting the grill racks within the internal grilling compartment.

13. The grilling device of claim 12, wherein the at least three grill racks of the grill rack system comprises:
a first grill rack having a first depth;
a second grill rack disposed above the first grill rack and having a second depth, the second depth being smaller than the first depth;
a third grill rack disposed above the second grill rack and having a third depth, the third depth being smaller than the second depth; and
the plurality of grill rack mounting elements for supporting the at least three grill racks in a vertically spaced configuration, the plurality of grill rack mounting elements connected to an inner surface of the outer wall.

14. The grilling device of claim 12, wherein the elongated oval shape of each of the first sidewall and the second opposing sidewall comprises an upper arcuate edge defining an upper apex, an opposing lower arcuate edge defining an lowermost point, and opposing linear side edges extending between the upper and lower arcuate edges.

15. The grilling device of claim 14, wherein the lid mounted to the first sidewall and the second opposing sidewall at a location offset from a vertical line extending between the upper apex and lowermost point of each of the first sidewall and the second opposing sidewall.

16. A grilling device, comprising:
an oven section comprising an outer wall at least partially defining an internal grilling compartment, the outer wall comprising:
opposing first and second sidewalls having elongated oval shapes, each of the first and second sidewalls defining an upper apex and a lower arcuate edge having a lowermost point, wherein the upper apex and lowermost point are at least substantially aligned on a vertical axis; and
an encircling body wall extending between the first and second sidewalls, the first and second sidewalls and the encircling body wall defining an access opening;
a lid mounted to the first and second sidewalls at a location offset from the vertical axis extending between the upper apex and lowermost point of the lower arcuate edge of each of the first and second sidewalls, the lid being actuatable between a closed position in which the lid covers the access opening and an open position in which the access opening is uncovered;
a handle attached to the lid, wherein an inner surface is configured to abut against and form a seal with at least substantially matching portions of outer peripheral edges of the opposing first and second sidewalls; and
a grill rack system, comprising:
a plurality of grill racks disposed in the internal grilling compartment, the plurality of grill racks comprising:
a first grill rack having a first depth;
a second grill rack disposed above the first grill rack and having a second depth, the second depth being smaller than the first depth; and
a third grill rack disposed above the second grill rack and having a third depth, the third depth being smaller than the second depth; and
a plurality of grill rack mounting elements for supporting the plurality of grill racks in a vertically spaced configuration, the plurality of grill rack mounting elements connected to inner surfaces of the first and second sidewalls of the outer wall.

17. The grilling device of claim 16, wherein the plurality of grill rack mounting elements further comprise one or more ledges extending from the inner surfaces of the opposing first and second sidewalls of the outer wall such that at least one of the plurality of grill racks is supportable by the one or more ledges.

18. The grilling device of claim 16, wherein the elongated oval shape of each of the opposing first and second sidewalls comprises an upper arcuate edge defining the upper apex, the lower arcuate edge defining the lowermost point, and opposing linear side edges extending between the upper and lower arcuate edges.

19. The grilling device of any one of claim 16, wherein respective front edges of the plurality of grill racks are progressively recessed compared to an adjacent lower grill rack.

20. The grilling device of claim 16, wherein the second and third grill racks each have a removable grill rack insert configured to allow food items placed on the first grill rack to extend up through both the second grill rack and the third grill rack.

* * * * *